(12) United States Patent
Mazeau et al.

(10) Patent No.: US 11,604,270 B2
(45) Date of Patent: Mar. 14, 2023

(54) METHOD FOR MEASURING DISTANCE BY APPROPRIATE FOURIER TRANSFORM AND RADAR SYSTEM FOR IMPLEMENTING THE METHOD

(71) Applicant: THALES, Courbevoie (FR)

(72) Inventors: Thierry Mazeau, Merignac (FR); Patrick Garrec, Merignac (FR)

(73) Assignee: THALES, Courbevoie (FR)

( * ) Notice: Subject to any disclaimer, the term of this patent is extended or adjusted under 35 U.S.C. 154(b) by 624 days.

(21) Appl. No.: 16/712,864

(22) Filed: Dec. 12, 2019

(65) Prior Publication Data
US 2020/0200893 A1 Jun. 25, 2020

(30) Foreign Application Priority Data
Dec. 20, 2018 (FR) ...................................... 1873303

(51) Int. Cl.
*G01S 13/87* (2006.01)
*G01S 13/08* (2006.01)
(Continued)

(52) U.S. Cl.
CPC ............ *G01S 13/874* (2013.01); *G01S 13/08* (2013.01); *G06F 7/556* (2013.01); *G06F 17/142* (2013.01); *G01S 13/345* (2013.01)

(58) Field of Classification Search
CPC ........ G01S 13/34; G01S 13/89; G01S 13/882; G01S 13/885; G01S 13/345; G01S 13/60;
(Continued)

(56) References Cited

U.S. PATENT DOCUMENTS 8,466,830 B2 * 6/2013 Kanamoto ............ G01S 13/345
342/107
8,552,907 B2 * 10/2013 Kanamoto .............. G01S 13/48
342/149
(Continued)

FOREIGN PATENT DOCUMENTS

CN 663503 A5 * 12/1987 .............. H03M 3/04
DE 102017210402 A1 * 12/2018 ........... G01F 23/284
(Continued)

OTHER PUBLICATIONS

Taneiji, et al., "Improving the Detection Accuracy of Frequency Modulated Continuous Wave Radar", 2018 International Conference on Signal Processing and Information Security (ICSPIS), pp. 1-4, Nov. 7, 2018.
(Continued)

*Primary Examiner* — Erin F Heard
*Assistant Examiner* — Michael W Justice
(74) *Attorney, Agent, or Firm* — BakerHostetler (57) ABSTRACT

A radar system configured to determine radar-ground distance measurements. The radar system includes transmission and reception means configured to transmit two radiofrequency signals towards the ground and to receive the signals obtained by the reflection of the two transmitted signals by the ground and computation means configured to determine the frequential representations of the transmitted signals and of the received signals and determine a frequential quantity as a function of the frequential representations. The radar system is wherein the computation means are configured to sample the frequential quantity over a determined number of samples, which provides a sampled signal; determine a number of frequency measurements as a function of a constant distance measurement accuracy value; determine frequency measurements by applying to the sampled signal a spectral decomposition by fast Fourier
(Continued)

transform using a decimation of the sampled signal in a ratio dependent on the distance measurement accuracy value, and determine a distance measurement corresponding to each frequency measurement.

6 Claims, 3 Drawing Sheets

(51) Int. Cl.
*G06F 7/556* (2006.01)
*G06F 17/14* (2006.01)
*G01S 13/34* (2006.01)

(58) Field of Classification Search
CPC ........ G01S 13/08; G01S 13/282; G01S 13/10; G01S 13/32; G01S 13/343; G01S 7/2883
USPC ............................ 342/63, 196, 191, 192, 128
See application file for complete search history.

(56) References Cited

U.S. PATENT DOCUMENTS

| | | | | |
|---|---|---|---|---|
| 9,820,716 | B2* | 11/2017 | Baba | G01S 7/52066 |
| 10,698,105 | B2* | 6/2020 | Aoki | G01S 13/931 |
| 10,718,861 | B2* | 7/2020 | Rick | G01S 17/88 |
| 10,859,691 | B2* | 12/2020 | Sharma | G01S 13/343 |
| 2003/0156054 | A1* | 8/2003 | Ishii | G01S 7/003 |
| | | | | 342/111 |
| 2007/0040728 | A1* | 2/2007 | Nishimura | G01S 13/426 |
| | | | | 342/107 |
| 2009/0088641 | A1* | 4/2009 | Baba | G01S 7/52066 |
| | | | | 600/455 |
| 2011/0193740 | A1* | 8/2011 | Kanamoto | G01S 13/345 |
| | | | | 342/158 |
| 2011/0309971 | A1* | 12/2011 | Kanamoto | G01S 7/295 |
| | | | | 342/147 |
| 2014/0218226 | A1* | 8/2014 | Raz | G01S 7/354 |
| | | | | 342/70 |
| 2015/0338505 | A1* | 11/2015 | Oshima | G01S 13/931 |
| | | | | 342/107 |
| 2019/0004175 | A1* | 1/2019 | Kato | G01S 13/87 |
| 2019/0086531 | A1* | 3/2019 | Rick | G01S 13/34 |
| 2019/0086534 | A1* | 3/2019 | Frick | G01S 13/582 |
| 2020/0064457 | A1* | 2/2020 | Sharma | G01S 7/285 |

FOREIGN PATENT DOCUMENTS

| | | | | |
|---|---|---|---|---|
| EP | 2 605 037 A1 | | 6/2013 | |
| EP | 2605037 A1 | * | 6/2013 | ............. G01S 13/60 |
| FR | 2984577 A1 | * | 6/2013 | ............. G01S 13/60 |
| JP | 2006126133 A | * | 5/2006 | ............. G01S 13/34 |

OTHER PUBLICATIONS

Gong, et al., "A high resolution algorithm based on Chirp Z-transform for FMCW radar", 2015 IEEE International Conference on Communication Problem-Solving (ICCP), pp. 482-484, Oct. 16, 2015.

Haixin, "A CZT-Linear Fitting Algorithm for Improving Ranging Precision of LFMCW Radar", TENCON 2018-2018 IEEE Region 10 Conference, pp. 1456-1459, Oct. 28, 2018.

* cited by examiner

METHOD FOR MEASURING DISTANCE BY APPROPRIATE FOURIER TRANSFORM AND RADAR SYSTEM FOR IMPLEMENTING THE METHOD

CROSS-REFERENCE TO RELATED APPLICATIONS

This application claims priority to foreign French patent application No. FR 1873303, filed on Dec. 20, 2018, the disclosure of which is incorporated by reference in its entirety.

FIELD OF THE INVENTION

The invention relates to the general field of airborne systems, helicopters or aircraft with pilot (aeroplanes) or without pilot (drones) for example. It relates more particularly to the distance measurements performed by a radar embedded on board one or other of these crafts.

BACKGROUND

The current radar systems adopt a specific mode of operation to perform a distance measurement which separates the craft with the embedded radar from the ground. This mode of operation implements the transmission of radiofrequency signals by the radar towards the ground and the analysis of the signals received by the radar, obtained after the reflection of the transmitted radiofrequency signals by the ground. The analysis of the time-frequency representations of the signals transmitted and received makes it possible to determine the delay between the transmitted signals and the received signals and to determine the distance which separates the airborne system from the ground.

According to this mode of operation, two radiofrequency signals denoted $e_0(t)$ and $e_1(t)$ are transmitted towards the ground during a time interval $T_E$. The frequency of the first signal $e_0(t)$ exhibits a positive linear variation during the first half of the time interval $[0, T_E/2]$ and the frequency of the second signal $e_1(t)$ exhibits a negative linear variation during the second half of the transmission time interval $[T_E/2, T_E]$. The frequencies of the transmitted signals vary in a frequency band B. The radiofrequency signals $e_0(t)$ and $e_1(t)$ are radiated by a transmitting antenna and are linearly modulated in frequency as a function of time so that they have the expressions:

$$e_0(t) = e^{i2\pi K t^2};$$ [Math. 1]

$$e_1(t) = e^{i2\pi(-K(t-T_E/2)+B)(t-T_E/2)}$$ [Math. 1]

with $K=B/T_E$, B representing the transmitted frequency band and $T_E$ representing the transmission time, or illumination time. The signal $e_1(t)$ corresponds to a temporal translation equal to $T_E$ of the signal $e_0(t)$.

The signals transmitted $e_0(t)$ and $e_1(t)$ are reflected by the ground. The reflected signals are also signals that are linearly modulated in frequency, their frequencies varying over the band B and representing, relative to the transmitted signals, a temporal shift, a delay, denoted $\tau$, and a frequency shift denoted $f_D$ due to the Doppler effect generated by the movement of the carrier. The temporal shift $\tau$ and the frequency shift are functions of the distance d separating the radar from the ground. More specifically, the temporal delay between the received signals and the transmitted signals is given by the expression $\tau=2d/c$, in which c represents the speed of light in a vacuum.

The reflected signals are then received by the radar system. The signals $r_0(t)$ and $r_1(t)$ correspond respectively to the signals received following the reflection by the ground of the signals $e_0(t)$ and $e_1(t)$. Taking account of the temporal and frequency shifts relative to the signals transmitted (the signal $r_0(t)$ exhibits a temporal shift $\tau$ and a frequency shift $f_D$ relative to the signal $e_0(t)$ and the signal $r_1(t)$ exhibits a temporal shift $\tau$ and a frequency shift $f_D$ relative to the signal $e_1(t)$), the reflected signals received have the expressions:

$$r_0(t) = e^{i \cdot 2\pi(Kt(t-\tau)+f_D t)} = e_0(t) \cdot e^{i \cdot 2\pi(-K\tau+f_D)t}$$ [Math. 2]

$$r_1(t) = e_1(t) \cdot e^{i \cdot 2\pi(K\tau+f_D)\left(t-\frac{T_E}{2}\right)} = e^{i2\pi\left(-K\left(t-\frac{T_E}{2}-\tau\right)+B+f_D\right)\left(t-\frac{T_E}{2}\right)}$$ [Math. 3]

Figure 1:
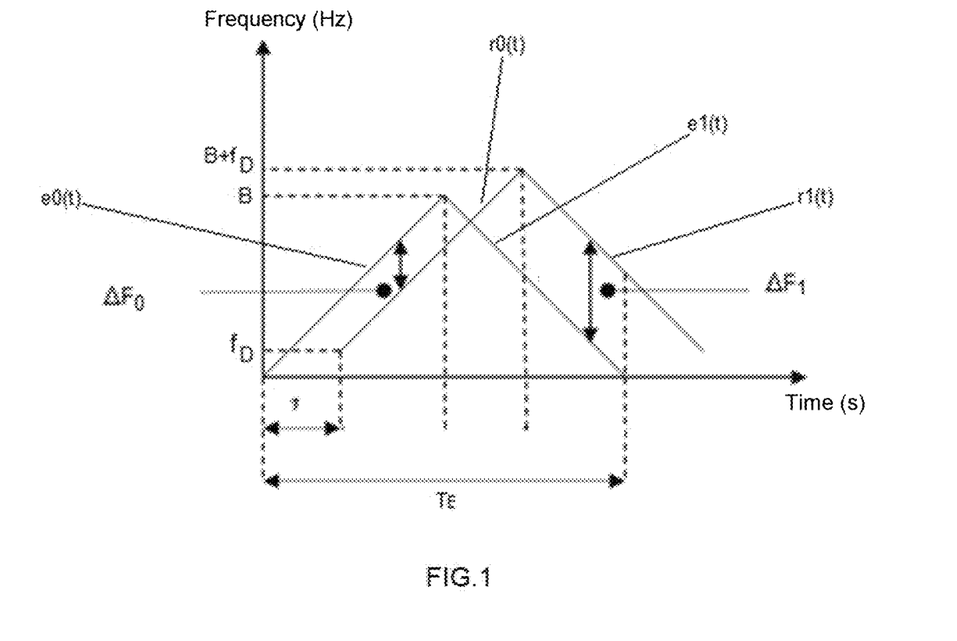
FIG. 1 represents diagrams in a time-frequency reference frame of the transmitted signals and of the received signals according to the mode of operation of the radar system according to the invention.

FIG. 1 represents the signals transmitted and the signals received as a function of time.

The received signals are then demodulated and converted into digital signals.

The determination of the measurement of the distance d separating the radar system from the ground is based, according to this mode of operation, on a spectral analysis of the received signals. In this context, a time/frequency representation of the signals transmitted and of the signals received is performed. In particular, for the instants t lying between 0 and $T_E/2$, the first transmitted signal $e_0(t)$ can be represented in the frequency domain by the signal $E_0(t)$, given by:

$$E_0(t) = Kt$$ [Math. 4]

The signal $E_0(t)$ represents the value of the frequency of the first signal $e_0(t)$ at the instant t considered. It presents as a frequency ramp with a coefficient (a slope) equal to $K=B/T_E$.

For the instants t lying between $T_E/2$ and $T_E$, the second transmitted signal $e_1(t)$ can be represented in the frequency domain by the signal $E_1(t)$ given by:

$$E_1(t) = -Kt + B$$ [Math. 5]

The signal $E_1(t)$ represents the value of the frequency of the second signal $e_1(t)$ at the instant t considered. It presents as a frequency ramp with a coefficient (a slope) equal to $-K$.

Similarly, the received signals can be represented in the frequency domain. More specifically, the received signal $r_0(t)$ corresponding to the reflection by the ground of the first signal $e_0(t)$ can be represented in the frequency domain, for the instants t lying between 0 and $T_E/2$, by the signal $R_0(t)$ given by:

$$R_0(t) = K(t-\tau) + f_D$$ [Math. 6]

$R_0(t)$ represents the value of the frequency of the signal $r_0(t)$ at the instant t considered. It presents as a frequency ramp similar to the signal $E_0(t)$ but shifted by a time interval $\tau$, on the x axis, and by a frequency $f_D$ on the frequency axis (the y axis).

For the instants t lying between $T_E/2$ and $T_E$, the received signal $r_1(t)$ corresponding to the reflection by the ground of the second signal $e_1(t)$ can be represented in the frequency domain by the signal $R_1(t)$ given by:

$$R_1(t) = -K(t-\tau) + B + f_D$$ [Math. 7]

$R_1(t)$ represents the value of the frequency of the signal $r_1(t)$ at the instant t considered. It presents as a frequency ramp similar to the signal $E_1(t)$ but shifted by a time interval $\tau$ on the x axis and by a frequency $f_D$ on the frequency axis (they axis).

The shift between the first transmitted signal $e_0(t)$ and the received signal $r_0(t)$ can be represented also in the frequency domain by effecting the difference between the value of the frequency $R_0(t)$ representing the value of the frequency of the received signal $r_0(t)$ and the value of the frequency $E_0(t)$ representing the value of the frequency of the first transmitted signal $e_0(t)$ at the instant considered. The shift can thus be represented by the frequential quantity $\Delta F_0$ given by:

$$\Delta F_0 = R_0(t) - E_0(t) = -K\tau + f_D \quad \text{[Math. 8]}$$

Similarly, the shift between the second transmitted signal $e1(t)$ and the received signal $r_1(t)$ can be represented in the frequency domain by effecting the difference between the value of the frequency $R_1(t)$ representing the value of the frequency of the received signal $r_1(t)$ and the value of the frequency $E_1(t)$ representing the value of the frequency of the second transmitted signal $e_1(t)$ at the instant considered. The shift can thus be represented by the frequential quantity $\Delta F_1$ given by:

$$\Delta F_1 = R_1(t) - E_1(t) = K\tau + f_D \quad \text{[Math. 9]}$$

The frequential measurements $\Delta F_0$ and $\Delta F_1$ make it possible to determine the temporal shift $\tau$ and consequently the measurement of the distance determined from the delay $\tau$ according to the equation $d = c \cdot \tau/2$. Indeed, by effecting the difference between the frequency measurements it is possible to write a frequential quantity D as:

$$D = \Delta F_1 - \Delta F_0 = 2K\tau \quad \text{[Math. 10]}$$

The determination of the frequential quantity D thus makes it possible to determine the delay $\tau$. The frequency difference D is a quantity with a value that is always strictly positive since it is proportional to the temporal delay and therefore to the distance.

The measurement of the distance d separating the radar system from the ground is determined by performing a spectral analysis of the signal D. The spectral analysis comprises a step of sampling of the signal D by a clock signal with a sampling frequency $F_{éch}$ (corresponding to a sampling period $T_{éch} = 1/F_{éch}$) and a step of spectral decomposition, for example by a fast Fourier transform. The spectrum thus formed is composed of frequential samples. The determination of the spectrum of the signal D by the determination of the frequential samples makes it possible, according to the equation (Math. 10), to determine measurements of frequency (given by $2K\tau$) of the signal D at each instant considered and consequently to determine the delay $\tau$ and the distance d that is desired to be measured.

The expression in the amplitude/time domain of the signal D can be in the form:

$$x_{(t)} = Ae^{-iK\omega\tau t} \quad \text{[Math. 11]}$$

with A representing the amplitude of the signal.

Figure 2:
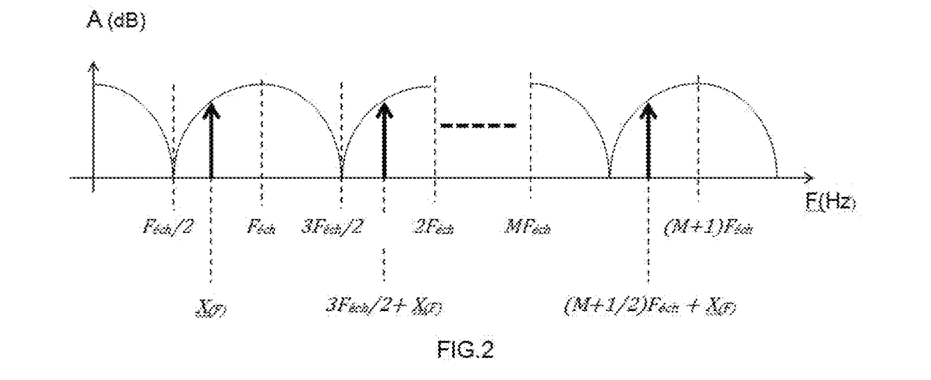
FIG. 2 represents the spectrum of the frequential signal derived from the frequential representations of the transmitted signals and of the received signals and the sampling of this signal according to the prior art.

FIG. 2 represents the spectrum of the signal $x_{(t)}$ sampled over M points at the frequency $F_{éch}$. The spectrum of the signal $x_{(t)}$ presents as an elementary spectrum of width equal to $F_{éch}$, replicated in the space of the frequencies with a periodicity equal to $F_{éch}$.

After FFT, this signal is denoted $X_{(F)}$. The spectral samples are denoted $f_j = X^*_j(F)$ and are given, according to the expression of the conventional FFT, by:

$$f_j = X^*_j(F) = \sum_{m=0}^{n-1} x_m e^{-\frac{i2\pi}{n}jm} \text{ with } j = 0, \ldots, n-1 \quad \text{[Math. 12]}$$

with n representing the number of spectral samples.

The frequency steps of the FFT are spaced apart in a constant manner. The frequential resolution of the FFT, given by $\Delta F = 1/(n \cdot T_{éch})$, is also constant. Thus, the higher the frequency, the more the ratio $P = F/\Delta F$ increases, this ratio designating the value of the accuracy of measurement of the frequency and therefore the value of the radar-ground distance measurement accuracy.

The spectral decomposition of the signal $x_{(t)}$ makes it possible to determine, unambiguously, the frequency spectrum (the centre frequency) of the signal $X_{(F)}$, inasmuch as the frequency band occupied by $X_{(F)}$ is less than $F_{éch}/2$. In the case where the frequency band occupied by $X_{(F)}$ is greater than this value, there is an ambiguity in frequency due to the aliasing of the spectrum of $X_{(F)}$, in a band $[-F_{éch}/2, F_{éch}/2]$ replicated periodically about frequencies that are multiples of the frequency $F_{éch}$. In the latter case, the frequency of the signal $X_{(F)}$ (and therefore the delay $\tau$) can be determined only modulo the sampling frequency $F_{éch}$.

To overcome the problems of ambiguity of frequencies generated by the sampling of the signal $x_{(t)}$, one known solution consists in increasing the sampling frequency. However, this solution necessitates either increasing the number of coefficients of the FFT used for the spectral decomposition, and therefore processing a greater number of spectral samples, or degrading the frequential resolution of the spectral response obtained by the FFT, which causes the distance resolution to be degraded. Now, increasing the computation load in such a way necessitates having sufficient computation capabilities to perform, in the time available, a calculation of the FFT over a sufficient number of points.

Moreover, depending on the value of the frequency F of the signal $X_{(F)}$, it is sometimes difficult, without having the necessary computation capabilities, to perform a distance measurement over a given distance range with a satisfactory resolution, from the simple spectral decomposition by FFT.

It is consequently necessary to develop radar-ground distance measurement means based on simple spectral analysis by FFT of the sampled signal $x_{(t)}$.

The appearance of ambiguities is induced by the compromise that has to be made between the use of a sampling frequency that is sufficient to avoid any spectral ambiguity, the number of measurements over which the FFT must be performed to obtain the desired spectral resolution and the computation capability available to perform an FFT over the desired number of points.

SUMMARY OF THE INVENTION

To this end, the subject of the invention is a radar system for determining measurements of radar-ground distance separating an aircraft from the ground by radar measurements. The radar system comprises transmission and reception means configured to transmit two radiofrequency signals towards the ground and to receive the signals obtained by the reflection of the two transmitted signals by the ground. The radar system can comprise computation means configured to determine the frequential representations of the transmitted signals and of the received signals and determine a frequential quantity as a function of these frequential representations. The radar system is characterized in that the computation means are configured to
sample the frequential quantity over a determined number of samples, which provides a sampled signal;
determine a number of frequency measurements as a function of a constant distance measurement accuracy value;
determine frequency measurements by applying to the sampled signal a spectral decomposition by fast Fourier transform over the number of measurements, the Fourier transform using a decimation of the sampled signal in a ratio dependent on the distance measurement accuracy value, and
determine a distance measurement corresponding to each frequency measurement.

In one embodiment, the transmitted signals may be composed of a first transmitted radiofrequency signal and of a second transmitted radiofrequency signal, the received signals being composed of a first received signal and of a second received signal, the first received signal corresponding to the signal obtained by the reflection of the first transmitted signal by the ground, the second received signal corresponding to the signal obtained by the reflection of the second transmitted signal by the ground, the computation means being configured to determine the frequential quantity by calculating the difference between a first frequential signal and a second frequential signal, the first frequential signal corresponding to the difference between the frequential representation of the first received signal and the frequential representation of the first transmitted signal, the second frequential signal corresponding to the difference between the frequential representation of the second received signal and the frequential representation of the second transmitted signal.

In one embodiment, the computation means may be configured to sample the frequential quantity according to a sampling period, the computation means being configured to determine a minimum sampling period as a function of a maximum frequency value and to determine a number of samples of the sampled signal as a function of a minimum frequency value and of the minimum sampling period.

In one embodiment, the computation means may be configured to determine an intermediate parameter as a function of the distance measurement accuracy value, the intermediate parameter being calculated by dividing a first value by a second value, the first value being calculated by adding the measurement accuracy value to the value two, the second value being calculated by subtracting the distance measurement accuracy value from the value two, the computation means being configured to determine the number of frequency measurements as a function of a minimum frequency value, of a maximum frequency value and of the intermediate parameter.

In one embodiment, the computation means may be configured to determine the number of frequency measurements by dividing a first logarithmic function by a second logarithmic function, the first logarithmic function corresponding to the Napierian logarithm of the ratio between the maximum frequency value and the minimum frequency value, the second logarithmic function corresponding to the Napierian logarithm of the intermediate parameter.

The invention further provides a method for determining radar-ground distance measurements, the method comprising:

the transmission of two radiofrequency signals towards the ground and the reception of the signals obtained by the reflection of the two transmitted signals by the ground;
the determination of frequential representations of the transmitted signals and of the received signals;
the determination of a frequential quantity as a function of the frequential representations.

The method is characterized in that it comprises the steps comprising:
the sampling of the frequential quantity over a determined number of samples, which provides a sampled signal;
the determination of a number of frequency measurements as a function of a constant distance measurement accuracy value;
the determination of frequency measurements by applying to the sampled signal a spectral decomposition by fast Fourier transform over the number of measurements, the Fourier transform using a decimation of the sampled signal in a ratio dependent on the distance measurement accuracy value, and
the determination of a distance measurement corresponding to each frequency measurement.

Advantageously, the embodiments of the invention make it possible to improve and adapt the distance resolution as a function of the measured radar-ground distance without increasing the number of FFT measurements used to perform the spectral decomposition of the frequential signal derived from the sampling of the frequential signal dependent on the frequential representations of the transmitted signals and of the received signals.

Advantageously, the embodiments of the invention allow distance measurements by appropriate Fourier transform by maintaining the accuracy of the distance measurement (which is constant) as a function of the measured distance (or the frequential resolution) and by adapting the frequential step of the measurements or FFT calculations by decimation at the measured distance.

Advantageously, the embodiments of the invention make it possible to adjust the frequential resolution as a function of the measured distance.

Advantageously, the embodiments of the invention allow distance measurements which do not maintain a constant frequential resolution as a function of increase in frequency to maintain a constant distance measurement accuracy value. This is obtained by spacing apart the sampling periods by decimation as a function of the frequency to be measured.

DETAILED DESCRIPTION

The embodiments of the invention provide a radar system and a method for determining radar-ground distance measurements according to a mode of operation which implements the spectral analysis of the frequential representations of the radiofrequency signals transmitted towards the ground and of the signals received following the reflection of the transmitted signals by the ground.

The radar system and the method according to the invention may be used for example in airborne systems, helicopters or aircraft with or without pilot for example.

Figure 3:
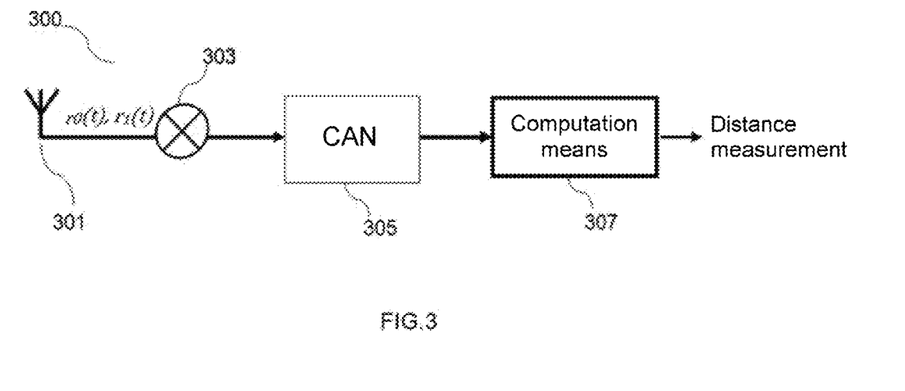
FIG. 3 represents a schematic view of a radar system, according to some embodiments of the invention.

Referring to FIG. 3, a radar system 300 configured to determine measurements of distance separating the radar from the ground is illustrated, according to some embodiments of the invention. The radar system 300 is configured to determine the distance measurements by using the mode of operation based on the transmission of radiofrequency signals towards the ground, the reception of these signals after reflection by the ground, and the spectral analysis of the transmitted and received signals. To this end, the radar system 300 can comprise transmission and reception means 301 configured to transmit two radiofrequency signals $e_0(t)$ and $e_1(t)$ towards the ground during a time interval $T_E$ and to receive the signals obtained by the reflection of the two transmitted signals by the ground, denoted $r_0(t)$ and $r_1(t)$. The frequency of the first signal $e_0(t)$ exhibits a positive linear variation during the first half of the time interval $[0,T_E/2]$ and the frequency of the second signal $e_1(t)$ exhibits a negative linear variation during the second half of the transmission time interval $[T_E/2,T_E]$. The frequencies of the transmitted signals vary in a frequency band B. The radiofrequency signals $e_0(t)$ and $e_1(t)$ are radiated by the transmission means 301, are linearly modulated in frequency as a function of time and are expressed by the expressions given in the equation (Math. 1).

The transmitted signals $e_0(t)$ and $e_1(t)$ are reflected by the ground. The reflected signals are also signals that are linearly modulated in frequency, their frequencies vary over the band B and represent, relative to the transmitted signals, a temporal shift $\tau$ and a frequency shift denoted $f_D$ due to the Doppler effect generated by the movement of the carrier. The signals received by the reception means 301 comprise a first received signal $r_0(t)$ corresponding to the signal received following the reflection of the first transmitted signal $e_0(t)$ by the ground and a second received signal $r_1(t)$ corresponding to the signal received following the reflection of the second transmitted signal $e_1(t)$ by the ground. The received signals are expressed by the expressions given in the equations (Math. 2) and (Math. 3).

The radar system 300 can comprise a mixer 303 configured to demodulate (or transpose) the received signals with the replica of the transmitted signals using an analogue-digital converter (CAN) 305 configured to convert the transposed signals into digital signals.

The radar system 300 can also comprise computation means 307 configured to perform a spectral analysis of the converted demodulated signals in order to determine measurements of distance separating the radar from the ground from frequency measurements.

Firstly, the computation means 307 may be configured to determine the frequential representations of the transmitted signals and of the received signals. For the instants t lying between 0 and $T_E/2$, the frequential representations $E_0(t)$ and $R_0(t)$ of the first transmitted signal $e_0(t)$ and of the first received signal $r_0(t)$ are given respectively by the equations (Math. 4) and (Math. 6). For the instants t lying between $T_E/2$ and $T_E$, the frequential representations $E_1(t)$ and $R_1(t)$ of the second transmitted signal $e_1(t)$ and of the second received signal $r_1(t)$ are given respectively by the equations (Math. 5) and (Math. 7).

According to one embodiment, the computation means 307 may be configured to determine a frequential quantity D as a function of the frequential representations of the transmitted signals and of the received signals. More specifically, the computation means 307 may be configured to determine the frequential quantity D by calculating the difference between a first frequential signal $\Delta F_0$ and a second frequential signal $\Delta F_1$, the first frequential signal $\Delta F_0$ corresponding to the difference between the frequential representation of the first received signal $R_0(t)$ and the frequential representation of the first transmitted signal $E_0(t)$ as expressed in the equation (Math. 8), the second frequential signal $\Delta F_1$ corresponding to the difference between the frequential representation of the second received signal $R_1(t)$ and the frequential representation of the second transmitted signal $E_1(t)$, as expressed in the equation (Math. 9).

According to one embodiment of the invention, the computation means 307 may be configured to determine the temporal shift $\tau$ and consequently the measurements of radar-ground distance from the frequential quantity D according to the relationship given by the equation (Math. 10). More specifically, the computation means 307 may be configured to determine radar-ground distance measurements by performing a spectral analysis of the frequential quantity D. The spectral analysis comprises a step of sampling of the signal D by a clock signal with a sampling frequency $F_{éch}$ corresponding to a sampling period $T_{éch} \geq 1/F_{éch}$ and a step of spectral decomposition by a fast Fourier transform.

To perform the sampling of the frequential quantity D, the computation means 307 may be configured to determine a minimum sampling period $T_{éch}$ as a function of a maximum frequency value $f_N$ according to the relationship given by:

$$T_{éch} = 1/2f_N \qquad [\text{Math. 13}]$$

The expression in the amplitude/time domain of the frequential quantity D may be given by the equation (Math. 11).

The computation means 307 may be configured to determine a number Z of the samples $x_m$ to be acquired of the sampled signal as a function of a minimum frequency value $f_0$ and of the sampling period according to the relationship given by:

$$Z = \frac{1}{f_0} \Big/ T_{éch} \qquad [\text{Math. 14}]$$

The computation means 307 may be configured to sample the frequential quantity represented by the signal $x_{(t)}$ over Z points (or samples).

The determination of the distance measurements according to the invention is performed by the determination of a number N of frequency measurements by appropriate FFT applied to the sampled signal while retaining a constant distance measurement accuracy value P.

The computation means 307 may be configured to determine a number N of frequency measurements as a function of a given distance measurement accuracy value P. More specifically, the computation means 307 may be configured to determine an intermediate parameter L as a function of a given distance measurement accuracy value P, the intermediate parameter being calculated by dividing a first value by a second value, the first value (2+P) being calculated by adding said measurement accuracy to the value two, the second value (2−P) being calculated by subtracting the distance measurement accuracy value P from the value two. The intermediate parameter is then expressed by:

$$L=(2+P)/(2-P) \quad \text{[Math. 15]}$$

In one embodiment of the invention, the computation means 307 may be configured to determine the number N of frequency measurements to be performed by the FFT, that is to say the number of spectral samples of the FFT, as a function of a minimum frequency value, of a maximum frequency value and of the intermediate parameter. More specifically, the computation means 307 may be configured to determine the number N of frequency measurements $f_j = X^*_j(F)$ to be calculated by the appropriate FFT by effecting the dividing of a first logarithmic function by a second logarithmic function, the first logarithmic function corresponding to the Napierian logarithm of the ratio between the maximum frequency value $f_N$ and the minimum frequency $f_0$, the second logarithmic function corresponding to the Napierian logarithm of the intermediate parameter L. The number N of frequency measurements by FFT is thus expressed by:

$$N = \frac{\ln(f_N / f_0)}{\ln(L)} \quad \text{[Math. 16]}$$

Once the number of frequency measurements to be performed is determined, the computation means 307 may be configured to determine the N frequency measurements $f_j = X^*_j(F)$ by applying to the sampled signal $x_{(t)}$ a spectral decomposition by fast Fourier transform over N points, the Fourier transform using a decimation of the sampled signal in a ratio dependent on the distance measurement accuracy value. More specifically, for each calculation of a frequency measurement $f_j = X^*_j(F)$ of index j, the decimation of the sampled signal is performed in a ratio equal to $1/L^{(N-j)}$ given by the inverse of the intermediate parameter to the power of the difference between the number of frequency measurements N and the index of the frequency measurement j.

According to the embodiments of the invention, the frequency measurement by appropriate FFT are expressed by:

$$f_j = X^*_j(F) = \sum_{m=0}^{N-1} x_m e^{-\frac{i2\pi}{N} jmK^{(N-j)}} \quad \text{with } j = 0, \ldots, N-1 \quad \text{[Math. 17]}$$

The determination of a frequency measurement $f_j$ allows the determination of a value of the delay τ according to the relationship of the equation (Math. 10) reformulated for the frequency measurements calculated by FFT by $f_j=2K\tau$. The determination of the delay τ at the measured frequency allows the determination of a distance measurement d corresponding to this frequency measurement according to the relationship d=c· τ/2.

In one embodiment of the invention, the distance measurement accuracy value may be given as a percentage.

The appropriate FFT according to the invention makes it possible to adapt the frequential step of the frequency measurements by FFT, by decimation, to the distance measured, while keeping a constant distance measurement accuracy value as a function of the measured frequency. In effect, to maintain a constant distance measurement accuracy value, it is not necessary, according to the invention, to maintain a constant frequential resolution as a function of the increase in frequency.

According to the embodiments of the invention, the frequential step of the FFT, denoted $\Delta F_j$, is widened gradually so as to maintain the constant distance measurement accuracy value $P=\Delta F_j/f_j$. The values of $f_j$ are distributed in a non-constant manner and the values of $x_m$ are samples spaced apart differently in time as a function of the measured frequencies $f_j$. The decimation of the sampled signal depends thus on the measured frequency as illustrated in the decimation ratio for the $j^{th}$ frequency measurement $f_j$ given by $1/(L^{(N-j)})$.

The invention provides further a method for determining radar-ground distance measurements by spectral analysis of radiofrequency signals transmitted and received by a radar system while maintaining a constant distance measurement accuracy value as a function of the increase in measured frequencies.

Figure 4:
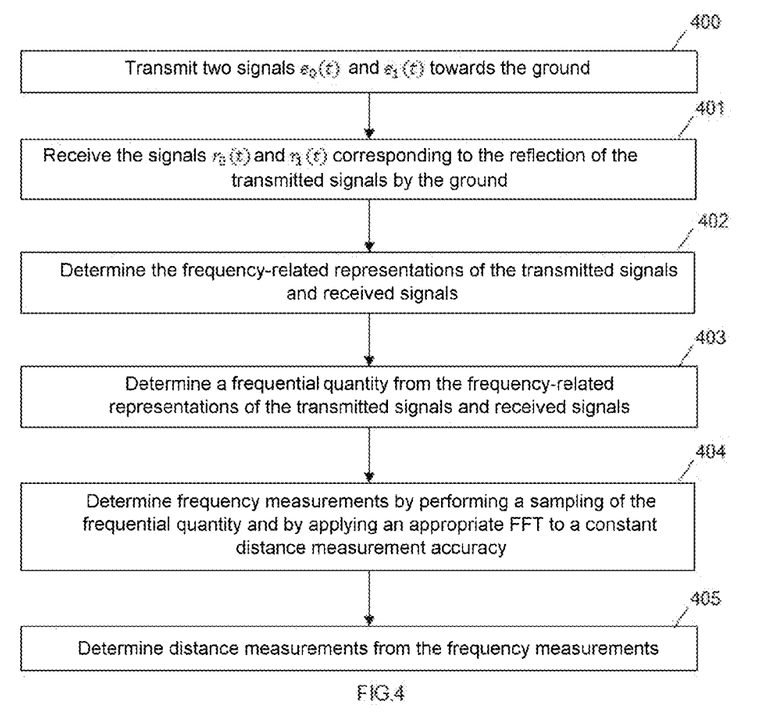
FIG. 4 represents a flow diagram illustrating a method for determining radar-ground distance measurements, according to some embodiments of the invention.

Referring to FIG. 4, the method can comprise steps for the transmission and the reception of two radiofrequency signals and steps for the processing of the received signals.

In the step 400, two radiofrequency signals $e_0(t)$ and $e_1(t)$ may be transmitted towards the ground during a time interval $T_E$ such that the frequency of the first signal $e_0(t)$ exhibits a positive linear variation during the first half of the time interval $[0,T_E/2]$ and the frequency of the second signal $e_1(t)$ exhibits a negative linear variation during the second half of the transmission time interval $[T_E/2,T_E]$. The frequencies of the transmitted signals vary in a frequency band B. The radiofrequency signals $e_0(t)$ and $e_1(t)$ are linearly modulated in frequency as a function of time and are expressed by the expressions given in the equation (Math. 1).

In the step 401, the signals obtained by the reflection of the transmitted signals by the ground may be received. The received signals comprise a first received signal $r_0(t)$ corresponding to the signal received following the reflection of the first transmitted signal $e_0(t)$ by the ground and a second received signal $r_1(t)$ corresponding to the signal received following the reflection of the second transmitted signal $e_1(t)$ by the ground. The received signals are expressed by the expressions given in the equations (Math. 2) and (Math. 3). The step 401 can comprise a substep for the demodulation of the received signals and the conversion of the demodulated signals into analogue signals.

In the step 402, frequential representations of the transmitted signals and of the received signals may be determined. For the instants t lying between 0 and $T_E/2$, the frequential representations $E_0(t)$ and $R_0(t)$ of the first transmitted signal $e_0(t)$ and of the first received signal $r_0(t)$ may be determined respectively by the equations (Math. 4) and (Math. 6). For the instants t lying between $T_E/2$ and $T_E$, the frequential representations $E_1(t)$ and $R_1(t)$ of the second transmitted signal $e_1(t)$ and of the second received signal $r_1(t)$ may be determined respectively by the equations (Math. 5) and (Math. 7).

In the step 403, a frequential quantity D may be determined as a function of the frequential representations of the transmitted signals and of the received signals. More specifically, the frequential quantity D may be determined by calculating the difference between a first frequential signal $\Delta F_0$ and a second frequential signal $\Delta F_1$, the first frequential signal $\Delta F_0$ corresponding to the difference between the frequential representation of the first received signal $R_0(t)$ and the frequential representation of the first transmitted signal $E_0(t)$ as expressed in the equation (Math. 8), the second frequential signal $\Delta F_1$ corresponding to the difference between the frequential representation of the second received signal $R_1(t)$ and the frequential representation of the second transmitted signal $E_1(t)$ as expressed in the equation (Math. 9).

In the step 404, N frequency measurements $f_j=X^*_j(F)$, $j=1, \ldots, N$ may be determined by performing a sampling of the frequential quantity D over a determined number of samples Z and by applying to the sampled signal a spectral decomposition by fast Fourier transform over the number N of frequency measurements, the Fourier transform using a decimation of the sampled signal in a ratio dependent on the distance measurement accuracy value.

According to one embodiment, the number N of measurements may be determined in the step 404 as a function of a constant distance measurement accuracy value.

In the step 405, radar-ground distance measurements may be determined from the frequency measurements determined in the step 404. This step can comprise a substep of determination of the temporal shift using the relationship $f_j=2K\tau$ between the temporal shift and each frequency measurement, and a substep of determination of a distance measurement d corresponding to the temporal shift measured for a given frequency measurement according to the relationship $d=c.\tau/2$.

Figure 5:
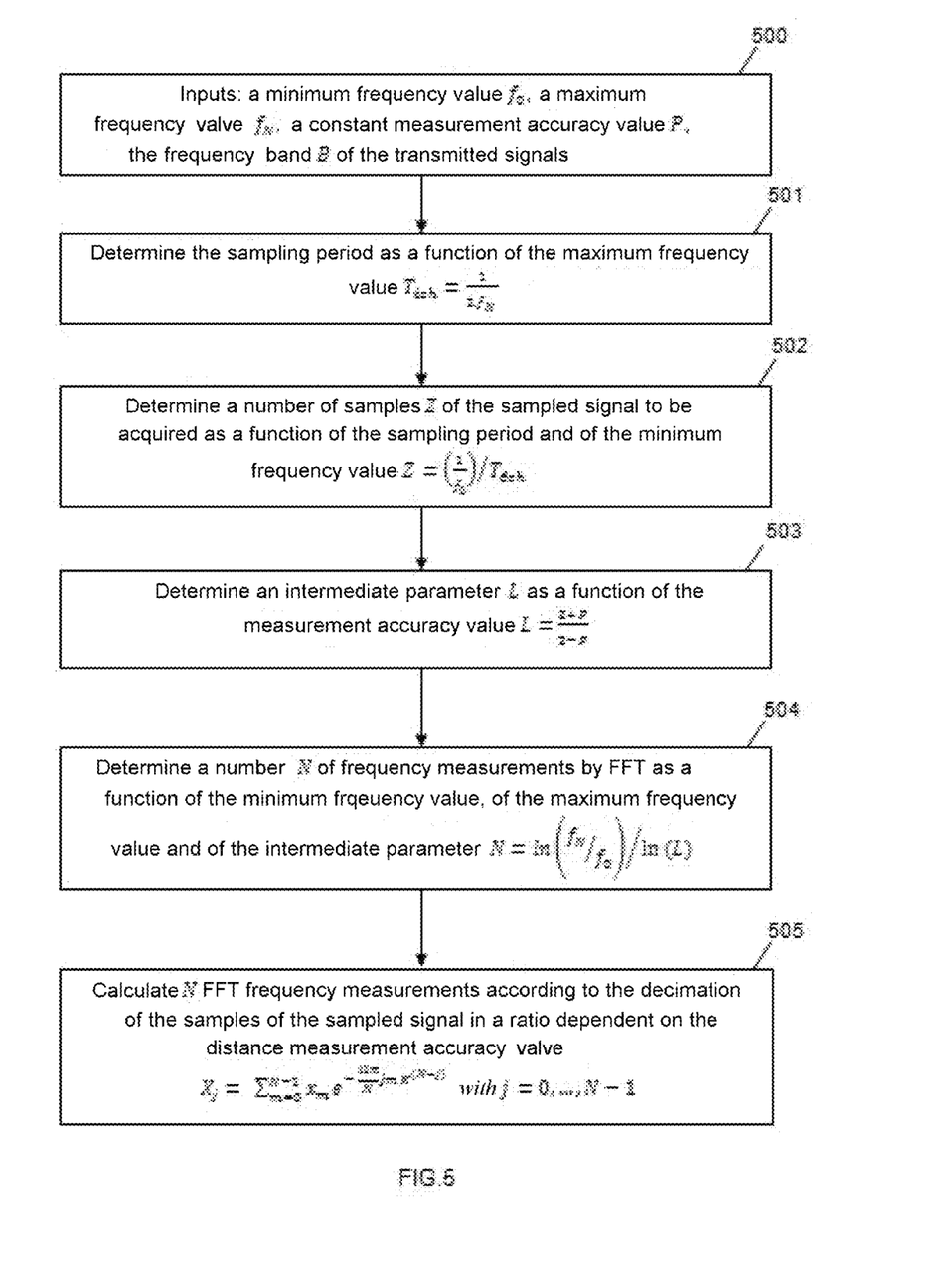
FIG. 5 represents a flow diagram illustrating a method for determining frequency measurements by appropriate FFT, according to some embodiments of the invention.

FIG. 5 is a flow diagram illustrating the step 404 of determination of frequency measurements according to some embodiments of the invention.

In the step 500, a minimum frequency value $f_0$, a maximum frequency value $f_N$, a constant measurement accuracy value P, and the frequency band B of the transmitted signals may be received.

In the step 501, a minimum sampling period may be determined as a function of the maximum frequency value such that $T_{éch} \le 1/2f_N$.

In the step 502, a number of samples Z of the sampled signal to be acquired may be determined as a function of the sampling period and of the minimum frequency value as expressed in the equation (Math. 14).

In the step 503, an intermediate parameter L may be determined as a function of the measurement accuracy value P as expressed in the equation (Math. 15).

In the step 504, the number N of frequency measurements to be performed by the FFT, that is to say the number of spectral samples of the FFT, may be determined as a function of the minimum frequency value $f_0$, of the maximum frequency value $f_N$ and of the intermediate parameter L as given in the equation (Math. 16).

In the step 505, N frequency measurements $f_j=X^*_j(F)$ may be determined by applying to the sampled signal $x_{(t)}$ a spectral decomposition by fast Fourier transform over N points, the Fourier transform using a decimation of the sampled signal in a ratio dependent on the distance measurement accuracy value. More specifically, for each calculation of a frequency measurement $f_j=X^*_j(F)$ of index j, the decimation of the sampled signal is performed in a ratio equal to $1/L^{(N-j)}$, given by the inverse of the intermediate parameter to the power of the difference between the number of frequency measurements N and the index of the frequency measurement j. The FFT frequency measurements are given by the equation (Math. 17).

The invention also provides a computer program product comprising code instructions making it possible to perform the steps of the method when said program is run on a computer.

Generally, the routines executed to implement the embodiments of the invention, whether they are implemented in the context of an operating system or of a specific application, of a component, of a program, of an object, of a module or of a sequence of instructions, or even of a subset thereof, can be designated herein as "computer program code" or simply "program code". The program code typically comprises instructions that can be read by computer which reside at various moments in various memory and storage devices in a computer and which, when they are read and executed by one or more processors in a computer, cause the computer to perform the operations necessary to execute the operations and/or the elements specific to the various aspects of the embodiments of the invention. The instructions of a program, that can be read by computer, to perform the operations of the embodiments of the invention, may be, for example, the assembly language, or even a source code or an object code written in combination with one or more programming languages.

The invention claimed is:

1. A radar system configured to determine radar-ground distance measurements, the radar system comprising:
   transmission and reception means configured to transmit two radiofrequency signals towards the ground and to receive the signals obtained by the reflection of the two transmitted signals by the ground;
   computation means configured to:
   determine the frequential representations of the transmitted signals and of the received signals;
   determine a frequential quantity as a function of said frequential representations;
   the radar system being wherein the computation means are configured to:
   sample said frequential quantity over a determined number of samples, which provides a sampled signal;
   determine a number of frequency measurements as a function of a constant distance measurement accuracy value;
   determine frequency measurements by applying to the sampled signal a spectral decomposition by fast Fourier transform over said number of measurements, the Fourier transform using a decimation of the sampled signal in a ratio dependent on said distance measurement accuracy value, and
   determine a distance measurement corresponding to each frequency measurement.

2. The radar system according to claim 1, wherein the transmitted signals are composed of a first transmitted radiofrequency signal and of a second transmitted radiofrequency signal, the received signals being composed of a first received signal and of a second received signal, the first received signal corresponding to the signal obtained by the reflection of said first transmitted signal by the ground, the second received signal corresponding to the signal obtained by the reflection of said second transmitted signal by the ground, the computation means being configured to determine said frequential quantity by calculating the difference between a first frequential signal and a second frequential signal, said first frequential signal corresponding to the difference between the frequential representation of the first received signal and the frequential representation of the first transmitted signal, the second frequential signal corresponding to the difference between the frequential representation of the second received signal and the frequential representation of the second transmitted signal.

3. The radar system according to claim 1, wherein the computation means are configured to sample said frequential quantity according to a sampling period, the computation means being configured to determine a minimum sampling period as a function of a maximum frequency value and to determine a number of samples of the sampled signal as a function of a minimum frequency value and of said minimum sampling period.

4. The radar system according to claim 1, wherein the computation means are configured to determine an intermediate parameter as a function of said distance measurement accuracy value, said intermediate parameter being calculated by dividing a first value by a second value, said first value being calculated by adding said measurement accuracy value to the value two, said second value being calculated by subtracting said distance measurement accuracy value from the value two, the computation means being configured to determine said number of frequency measurements as a function of a minimum frequency value, of a maximum frequency value and of said intermediate parameter.

5. The radar system according to claim 4, wherein the computation means are configured to determine the number of frequency measurements by the division of a first logarithmic function by a second logarithmic function, the first logarithmic function corresponding to the Napierian logarithm of the ratio between the maximum frequency value and the minimum frequency value, the second logarithmic function corresponding to the Napierian logarithm of said intermediate parameter.

6. A method for determining radar-ground distance measurements comprising:
- the transmission of two radiofrequency signals towards the ground and the reception of the signals obtained by the reflection of the two transmitted signals by the ground;
- the determination of frequential representations of the transmitted signals and of the received signals;
- the determination of a frequential quantity as a function of said frequential representations;
the method being wherein it comprises the steps comprising:
- the sampling of said frequential quantity over a determined number of samples, which provides a sampled signal;
- the determination of a number of frequency measurements as a function of a constant distance measurement accuracy value;
- the determination of frequency measurements by applying to the sampled signal a spectral decomposition by fast Fourier transform over said number of measurements, the Fourier transform using a decimation of the sampled signal in a ratio dependent on said distance measurement accuracy value, and
- the determination of a distance measurement corresponding to each frequency measurement.

* * * * *